July 8, 1941.  P. FELLMAN ET AL  2,248,223
BICYCLE
Filed Dec. 3, 1940

Inventors:-
Pauline Fellman
Milton Fellman

Patented July 8, 1941

2,248,223

UNITED STATES PATENT OFFICE 2,248,223

BICYCLE

Pauline Fellman and Milton Fellman, Long Beach, N. Y.

Application December 3, 1940, Serial No. 368,328

1 Claim. (Cl. 280—209)

This invention relates to bicycles and has for its object to provide a vehicle which is adapted to be ridden by two riders, which is simple in construction and more efficient in use than those heretofore proposed.

With these and other objects in view the invention resides in the novel details of construction and combinations of parts as will be disclosed more fully hereinafter and particularly pointed out in the claim.

Referring to the accompanying drawing forming a part of this specification and in which like numerals designate like parts in all the views—

Figures 1, 2, 3, 4:
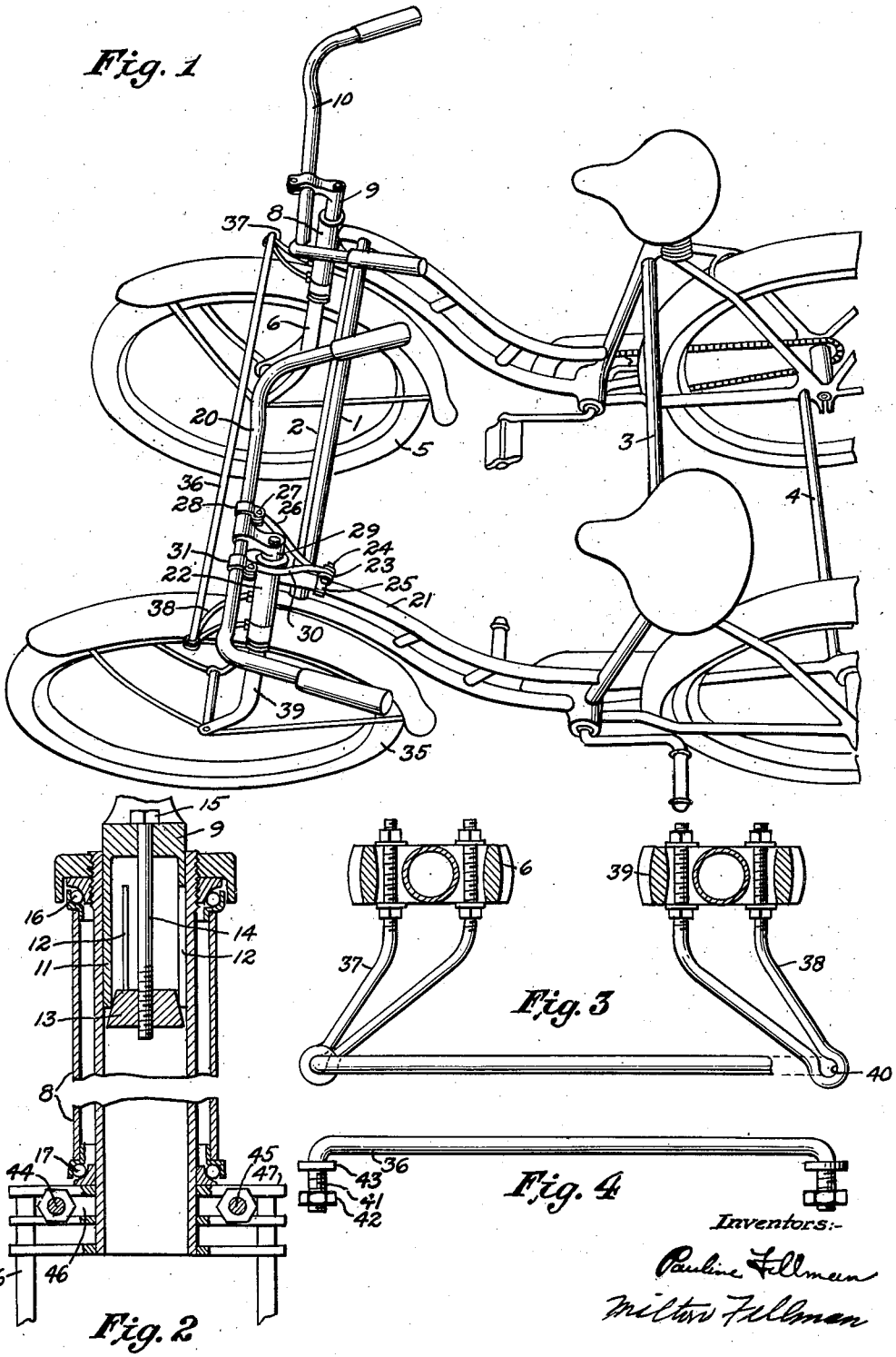
Fig. 1 is a perspective view of a vehicle made in accordance with this invention.
Fig. 2 is a vertical sectional view through the head of a bicycle frame to illustrate the connection between the handle-bars and the front fork, whereby steering of the front wheel may be effected.
Fig. 3 is a horizontal plan view of the connection between the front forks of two bicycles whereby simultaneous steering movement of both front wheels may be effected.
Fig. 4 is a detail view illustrating the steering rod used in the connection illustrated in Fig. 3.

This application constitutes a refiling and continuation-in-part of our application Serial No. 362,482, filed October 23, 1940.

The purpose of this invention, particularly, is to provide a vehicle comprising two relatively standard bicycles rigidly joined together so that one bicycle is alongside the other, with the steering of the vehicle controlled solely by one of the riders. This makes riding pleasure possible not only for an individual who has never ridden a bicycle, but also for one who has the fear of falling from a single bicycle because of inability to balance himself as well as inability to steer. In other words, by this invention two bicycles are rigidly secured together in sidewise relation to produce one vehicle with four wheels which cannot tip nor fall over, so that an experienced rider may mount the one bicycle adapted to control the steering of the entire vehicle, and any one, young, or old, may mount the other bicycle and enjoy riding exercise with the experienced rider, it being a feature of this invention that the handlebars of the said other bicycle are free of guiding connection with its front wheel and fixed in non-turning position.

More specifically, the invention comprises two relatively standard and similar bicycles rigidly joined together in sidewise relation as by the bars 1, 2, 3 and 4, the bars 1 and 2 connected at their ends respectively to the upper and lower frame members of the bicycles adjacent the frame heads, the bar 3 connected at its ends to the frames closely adjacent the bicycle seats, and the bar 4 connected at its ends to the frames closely adjacent the rear axles of the bicycles, it being understood that all of these bars will be substantially horizontal and connected at right angles to the respective members of the bicycle frames, the connections being made as found most suitable but preferably by welding or brazing. Thus it will be understood that the bicycle frames, thus rigidly connected together, constitute what may be said to be a unitary vehicular structure to be propelled by pedaling action of either one or both of the bicycles.

One bicycle has the usual and well-known guiding means comprising a front wheel 5 mounted in a fork 6 having a stem 7 disposed within the head 8 of the bicycle frame, said stem suitably connected to the post 9 of the handlebars 10 so that movement of the handlebars will cause turning movement of the front wheel. The connection between said stem and said post may be as desired, but in Fig. 2 there is illustrated a specific example of such connection and according to which the stem 7 is tubular to slidingly receive the post 9 in the upper portion thereof, the lower portion of said post being tubular to provide relatively thin walls indicated at 11 having a plurality of slots or kerfs 12 extending longitudinally of the post inwardly from the lower extremity thereof, with a cone 13 centrally threaded for reception of the lower end of the bolt 14 the head 15 of which extends out of the post 9 and may be turned by a suitable wrench to cause the cone 13 to move axially of the bolt and produce wedging action against the wall 11 of the post to create a tight frictional engagement between said wall and the interior surface of the stem 7, the kerfs 12 permitting the outward flexing of the post wall into such frictional and locking engagement with the stem. Any suitable means may be employed for preventing rotation of the cone, as for example ribs on the exterior surface thereof registerably engageable with the kerfs 12. By this construction, vertical adjustment of the handlebars is permitted. The stem 7 is suitably positioned within the head 8 of the bicycle frame so that turning movement of the handlebars will cause rotation of the post 9 and in turn, through frictional engagement of the latter with the stem, cause turning movement of the fork 6 rigidly connected to the stem, and thus produce turning movement of the front wheel of the bicycle for steering purposes, ball races 16 and 17 being indicated for reducing to a minimum the frictional resistance to the turning movement of the stem 7.

The other bicycle is a substantial duplicate of the construction hereinbefore described, the chief difference residing in the fact that its handlebars 20 are fixed so as to have no turning movement. This is accomplished by means of a bracket one end of which is securely clamped for example to the upper member 21 of the bicycle frame just back of the head 22, and the other end of which is securely clamped to either the handlebars or the post therefor, whereby any tendency of the handlebars to turn is prevented by said bracket.

Various types of brackets may be employed to accomplish this rigid connection or lock between the handlebars and the bicycle frame, but in Fig. 1 there is illustrated a type of bracket that has been found practical and which comprises a unitary round rod bent at its middle to provide an eye 23 through which the bolt 24 of a clamp 25 may pass, said clamp encircling the frame member 21 of the bicycle, the two branches of said rod being divergently directed as shown with the end of one branch 26 formed with a bolt receiving aperture through which the bolt 27 of a clamp 28 may pass, said clamp 28 encircling the handlebar 20 to one side of the handlebar post 29, the other branch 30 of the rod having its end similarly formed and secured to a clamp 31 (similar to clamp 28) encircling the handlebar to the other side of the handlebar post 29. Thus the clamps 25, 28 and 31 together with the branches 26 and 30 of the rod, constitute a bracket giving three-point securement between the handlebars 20 and the frame of the bicycle, the three points of securement being substantially equidistant from each other and resulting in an exceptionally rigid and strong lock or securement against turning of said handlebars.

Whereas ordinarily, in the standard bicycle, the handlebars have a frictional or substantially rigid connection with the stem of the front wheel fork, as hereinbefore brought out, in the bicycle whose handlebars 20 are rigidly secured against turning movement to the frame of the bicycle, the construction illustrated in Fig. 2 may be employed but in such case the cone 13 is not moved axially upward of the bolt 14 to such a position as will cause the frictional lock between the stem 7 and the post 9. However, the bolt 14 is turned sufficiently to advance the cone 13 upwardly a sufficient distance so that the walls 11 of the post 9 will be in slip-frictional engagement with the interior surface of the stem 7, whereby relative movement is possible between said stem and said post without such looseness of the cone 13 as to cause a rattle when the vehicle is being propelled. The three point securement of the handlebars 20 to the frame member 21 substantially prevents the handlebar post 9 from any longitudinal movement of said post in the stem 7 of the front fork. Obviously, other suitable constructions may be employed to provide the nonrigid connection between the stem 7 and post 9.

So that turning movement of the handlebars 10 of the one bicycle may cause steering movement of the front wheel 35 of the other bicycle, there is provided a steering rod 36 one end of which is pivotally secured to a bracket 37 rigidly carried by the front fork 6 of the said one bicycle, and the other end of which rod is pivotally secured to a bracket 38 rigidly carried by the front fork 39 of the said other bicycle. Any suitable type of bracket may be employed in conjunction with this steering rod 36, but a simple and practical bracket construction is particularly illustrated in Fig. 3 and comprising a unitary round rod bent at its middle to provide an eye indicated at 40 through which the bent over and threaded end 41 of the steering rod 36 may pass, the nut 42 securing said eye against a shoulder 43 which may comprise a ring welded or brazed on said end 41 as shown in Fig. 4. The two branches of the bracket 37 are divergently directed from the eye 40 as shown, and have their ends such as 44 and 45 (see Fig. 2) passed through the upper space 46 for example of the double crown 47 of the front fork of the bicycle, said ends being threaded and provided with nuts and washers engaging the opposite faces of said crown, for firmly securing the bracket in place. The brackets 37 and 38 are duplicates in construction, and the opposite ends of the steering rod 36 are similarly formed, but it is an important feature of this invention that the eye such as 40 of each bracket is outwardly disposed of the vehicle with respect to the vertical plane of the wheel carried by is supporting fork, as clearly indicated in Fig. 3; in other words the two brackets have their eye portions divergently disposed with respect to each other, so that the distance between the eyes of the two brackets is greater than the distance between the two front wheels.

The length of the bracket and the position of its eye 40 is made so as to give the maximum efficiency in the turning of the front wheels, without creating a drag of the wheel on the outside of the turn being made, such drag resulting in the wearing away or abrading of the surface of the rubber tire. This is believed well understood, since in turning a corner, a vehicle such as this one will have its front wheels turned about the axes of their respective fork stems, wherefore the axles of these wheels will be changed from coaxial relation (as in straight forward travel) to parallel relation (when the turn is being made), and hence it is necessary to provide such a construction as herein illustrated to compensate for this change of axle relation and thus make each wheel properly track in the arc of the turn being made by the vehicle. As a specific example it might be stated that a practical and efficient bracket has been found to be one wherein the eye 40 is disposed substantially 3⅛ inches in advance of the front face of the fork, and 2½ inches from the center of the tire.

It is obvious that those skilled in the art may vary the details of construction and arrangements of parts without departing from the spirit of this invention and therefore it is desired not to be limited to the exact foregoing disclosure except as may be required by the claim.

What is claimed is:

In a device of the character described the combination of two bicycles rigidly joined together in sidewise relation, each bicycle comprising a frame, a steerable front wheel, a fork supporting said wheel, handlebars, and connections between said fork and said handlebars whereby the latter normally controls the steering of the front wheel; means for connecting the fork of one bicycle to the fork of the other bicycle whereby simultaneous steering movement is imparted to both front wheels, said means comprising a bracket rigidly carried by each fork and whose outermost end extends forwardly and outwardly with respect to the wheel carried by its fork, the outward extent being substantially five-sixths of the forward extent, and a rod whose ends are pivotally mounted in the outermost ends of both brackets; and means for rendering inoperative the steering connections between the handlebars of one bicycle and the fork of its front wheel.

PAULINE FELLMAN.
MILTON FELLMAN.